United States Patent Office 3,565,870
Patented Feb. 23, 1971

---

3,565,870
PROCESS FOR EVALUATING DEGREE OF VULCANIZATION OF VULCANIZED RUBBER ARTICLES
Hirokazu Iino, Nishinomiya-shi, Japan, assignor to Sekaicho Rubber Company, Limited, Osaka-shi, Japan, a juridical person of Japan
No Drawing. Filed Oct. 28, 1968, Ser. No. 771,296
Claims priority, application Japan, Oct. 31, 1967, 42/70,345
Int. Cl. C08f 27/06; B29c 25/00
U.S. Cl. 260—79.5          9 Claims

ABSTRACT OF THE DISCLOSURE

A film of polyisopropene is coated on the surface of a vulcanizable rubber article, the coated article is vulcanized, and the fluorescence of the vulcanized article under exposure to ultraviolet light is evaluated as a measure of the degree of vulcanization of the article.

---

The invention relates to the field of evaluating the degree of vulcanization of vulcanized rubber articles.

When vulcanized natural rubber is irradiated with ultraviolet light, it emits strong fluorescence depending on the degree of vulcanization thereof, which is known in the art. This property is utilized in evaluating the degree of vulcanization of natural rubber products. This method is simple and does not require the destruction of the sample, so that the method has been advantageously used for evaluating the degree of vulcanization of individual finished products in commercial production lines.

On the other hand, in the case of vulcanized synthetic rubbers, when they are exposed to ultraviolet light, some will emit strong fluorescence, and others will emit only weak fluorescence, and the brightness of the fluorescence will not depend on the degree of vulcanization. As a result of the research of the present inventor, it has been found that the magnitude of the brightness of the fluorescence emitted by vulcanized rubber and resulting from irradiation of the ruber with ultraviolet light depends on the isoprene monomer content of the rubber polymer. The irradiation, with ultraviolet light, of vulcanized products made from a syntheic rubber which has a $\geq 50$ weight percent content of isoprene monomer will cause such synthetic rubber to emit strong fluorescence depending on the degree of vulcanization of such rubber, similar to the fluorescence emitted by vulcanized natural rubber. However, when ultraviolet light is irradiated onto vulcanized products made from a synthetic rubber which has a $<30$ weight percent content of isoprene monomer, the fluorescence emitted therefrom is so weak that it is difficult to identify or evaluate, and the brightness of the fluorescence bears almost no relationship to the degree of vulcanization of the products.

Further, if carbon black is added to a natural rubber or synthetic isoprene rubber based composition which would otherwise emit strong fluorescence depending on the degree of vulcanization thereof under exposure to ultraviolet light, the fluorescence of the carbon black filled vulcanized composition is very weak and unidentifiable and its brightness will not depend on the degree of vulcanization. Thus, vulcanized rubber products containing carbon black, irrespective of the kind of rubber used therein, emit weak fluorescence under exposure to ultraviolet light which cannot be readily evaluated and the brightness of the fluorescence is independent of the degree of vulcanization.

It is extremely difficult therefore to determine the degree of vulcanization by exposing to ultraviolet light vulcanized rubber products which have the above-mentioned characteristics, and chemical analysis and other physical tests have to be resorted to for this purpose. However, such alternate procedures are complicated and usually require the destruction of the materials tested, thus making such procedures impractical for the inspection of finished products, and this is a serious disadvantage of such procedures.

An object of the invention is to provide a method for evaluating the degree of vulcanization of vulcanized rubber articles which emit weak fluorescence under exposure to ultraviolet light.

Another object of the invention is to provide a method which will allow for the evaluation, with the naked eye, of the degree of vulcanization of such vulcanized rubber articles.

A still further object of the invention is to provide a method which will allow for a determination of the optimum vulcanization point of rubber products, which, heretofore, emitted fluorescence which could not be correlated to the degree of vulcanization thereof.

The above and other objects of the invention will be clear from the description to follow.

The essence of the present invention involves coating a vulcanizable composition which has been molded into a desired shape with a film of polyisoprene, vulcanizing the thus coated article, and then evaluating the fluorescence of the vulcanized article under exposure to ultraviolet ligt as a measure of the degree of vulcanization of the article.

It is intended by the inventor of the present invention that the following terms are to have the following definitions when used in the specification and claims herein:

| Term | Definition |
|---|---|
| (1) "Fluorescence" | The luminescent emission of electromagnetic radiation by a substance under exposure to ultraviolet light. |
| (2) "Fluorescent material" | A substance that emits fluorescence. |
| (3) "Weak fluorescence" | A degree of brightness of the fluorescence of a fluorescent material which is <10 under exposure to ultraviolet light having a wave length of 250–400 m$\mu$ when measured by the procedure of Example 1–(3)(a) herein. |
| (4) "Strong fluorescence" | A degree of brightness of the fluorescence of a fluorescent material which is $\geq 10$ under exposure to ultraviolet light having a wave length of 250–400 m$\mu$ when measured by the procedure of Example 1–(3)(a) herein. |
| (5) "Vulcanizable composition" | A composition comprising a vulcanizable rubber, a vulcanizing agent for such rubber and, optionally, carbon black and other adjuvants. |

The objects of the present invention can be attained by molding into a desired shape a vulcanizable composition such as is described below, coating a small portion of the surface of the shaped vulcanizable composition with a film of a polymer of isoprene having not less than 50 weight percent of isoprene monomer in its polymeric structure, vulcanizing the thus coated composition, irradiating ultraviolet light to the polyisoprene film on the resultant vulcanized rubber product, and then measuring the fluorescence emitted from the irradiated surface of the film as a means of evaluating the degree of vulcanization of the rubber.

According to the invention, on the surface of the shaped vulcanizable composition there is formed a film or coating of a polymer of isoprene which contains not less than 50 weight percent of isoprene monomer, and then the coated vulcanizable composition is vulcanized. By irradiating ultraviolet light to the film covering the resultant vulcanized product it was unexpectedly found that the fluorescence which is emitted from the film is much stronger than could be expected from the vulcanized rubber product alone without said film and the brightness of the fluorescence may be correlated to the degree of vulcanization of the vulcanized product. Thus, according to the invention, the degree of vulcanization of the product is readily evaluated with the aid of ultraviolet light.

The vulcanizable compositions which are used in the present invention include all those for which, heretofore, it has not been possible to readily determine the degree of vulcanization thereof by the use of ultraviolet light.

The rubbers which may be used in such vulcanizable compositions include natural rubber as well as synthetic rubber which may or may not contain isoprene monomer in the polymeric structure thereof, and such rubber can be used individually or in admixtures thereof in such vulcanizable compositions. Examples of the synthetic rubbers are synthetic isoprene rubber (IR), nitrile-isoprene rubber (NIR), styrene-butadiene rubber (SBR), ethylene-propylene-diene terpolymer (EPDM), butadiene rubber (BR), nitrile-butadiene rubber (NBR), chloroprene rubber (CR), isobutylene-isoprene rubber (IIR), urethane rubber and alkylene oxide rubbers such as propylene oxide rubber. The preferred of such rubbers are those which are sulfur curable or vulcanizable.

In addition to said rubbers the vulcanizable composition will contain a vulcanizing agent, such as sulfur and organic peroxides, for the rubber. The preferable vulcanizing agent is sulfur and it is preferably used in the range of 0.5–5 parts by weight per hundred parts by weight of rubber, and most desirable in the range of 1.0–3.0 parts by weight per hundred parts by weight of rubber. The vulcanizable composition may or may not contain carbon black which may be employed for the purpose of coloring and/or reinforcing the product, and it may be used in amounts of more than 3 parts by weight per hundred parts by weight of rubber and for reinforcing purpose as much as 25–150 parts by weight per hundred parts by weight of rubber may be used. The interception of the emission of fluorescence by the carbon black is about the same regardless of the amount thereof which is added to the vulcanizable composition, and has made the determination of the degree of vulcanization, by the use of ultraviolet light, difficult prior to the present invention.

The vulcanizable compositions used in the invention are those which in their vulcanized state only emit fluorescence under exposure to ultraviolet light, which is weak or not related to the degree of vulcanization. One type of such vulcanizable compositions is a composition having above characteristics only due to the property of the rubber used and another is a composition having above characteristics due to the interception effect of carbon black added therein. The former composition is one containing synthetic rubber having less than 30 weight percent of isoprene in its polymeric structure and a vulcanizing agent without carbon black. The latter composition is one containing natural rubber or any of synthetic rubbers and a vulcanizing agent with carbon black. The rubbers which contain less than 30 weight percent of isoprene include synthetic rubber having no isoprene therein such as SBR, EPDM, BR, NBR, CR, urethane rubber and alkylene oxide rubber as well as synthetic rubber containing less than 30 weight percent of isoprene, such as IIR. IIR generally contains 1–5 weight percent isoprene.

To the vulcanizable compositions there can also be added, as required, vulcanization accelerators, antioxidants, softeners, reinforcing agents, fillers, coloring materials, etc. in any desirable combination thereof according to the intended use of the vulcanized product, provided that such adjuvants are not fluorescent materials. If they are fluorescent materials they should not be used in amounts which would cause a reading of more than 10 units of brightness of fluorescence as measured by the procedure of Example 1–(3)(a) below.

The vulcanizable composition may be shaped by any of the conventional molding methods into the desired shape in accordance with the intended application for the vulcanized products.

According to the invention, before vulcanizing the shaped vulcanizable composition thin film of natural rubber or a synthetic rubber containing not less than 50 weight percent of isoprene monomer is placed on the surface of the shaped vulcanizable composition. Synthetic rubber containing not less than 50 weight percent of isoprene monomer includes, for example, synthetic isoprene rubbers consisting only of isoprene monomer and synthetic rubbers comprising $\geq 50 < 100$ weight percent of isoprene monomer and one or more other monomers. Typical of the latter type of polymeric rubbers is NIR which is available under the trademark "Krynac 833X1" and it contains 69 weight percent of isoprene. Particularly desirable for use in the film are natural rubber and synthetic homopolymeric isoprene rubber. It is essential that the isoprene polymer film does not contain a vulcanizing agent that would cause vulcanization of the film. In such a case, during the vulcanization of the shaped vulcanizable composition, the isoprene polymer film would also be vulcanized, and when it is subsequently exposed to ultraviolet light the fluorescence from the vulcanized film would predominate irrespective of the degree of vulcanization of the shaped composition and thus the desired determination of the degree of vulcanization of the finished products would be hampered. The film should contain little or no carbon black. If the film contains more than 3 weight percent of carbon black, then the ultraviolet light which is applied after vulcanization of the shaped articles, will provide little or no emission of fluorescence.

The isoprene polymer which is to be used to form the film on the vulcanizable composition is preferably a solid rubber. Other types of polymers may be used provided that the polymer has a molecular weight or degree of polymerization such that the polymer will not vaporize and/or disintegrate during the vulcanization of the vulcanizable composition.

The thickness of the isoprene polymer film is generally 0.01–2.0 mm., and preferably 0.1–1.0 mm. thick. The size of the film can vary depending on the shape of the molded articles but a patch of about 2–3 cm.$^2$ in area is sufficient for the purposes of the present invention, and, if necessary, a plurality of such patches can be provided at several positions on the surface of the articles. The film can be formed in various ways. For example, it can be formed by coating the surface of the articles with a solution of the isoprene polymer, which is then dried to remove the solvent therefrom, or by mounting a previously prepared film on the surface of the articles. When using any of these methods, in order to prevent oxidization of the surface of the film during or after vulcanizing the articles, which could lead to errors in measuring the brightness of the fluorescence, it is desirable to place a thin plastic film, about 0.01–0.1 mm. thick, of polyester, cellophane, etc. on the surface of rubber film to exclude the air.

The plastic film need not be removed before evaluating the brightness of the fluorescence of the isoprene polymer film unless the plastic used is one which is a fluorescent material or one which absorbs fluorescence.

The most desirable method of placing the isoprene polymer film on the molding is to coat a thin plastic film with a solution of the isoprene polymer, dry the coated plastic film, and then place the isoprene polymer film coated side of the plastic film on the surface of the molding. In placing the isoprene polymer film on the molding care should be taken to avoid the formation of void areas or air pockets between the film and the molding.

The moldings on which the isoprene polymer film has been placed may then be vulcanized by any of the conventional methods, such as press vulcanization, hot air vulcanization and the like.

The inspection or evaluation of the degree of vulcanization of the vulcanized article is performed by exposing the isoprene polymer film on the vulcanized article to ultra-violet light after removing or not removing the plastic film on the isoprene polymer film, during which the brightness of the fluorescence emitted therefrom is measured. Ultra-violet light rays having wave lengths ranging between 250–400 m$\mu$ are particularly advantageous, whereby strong fluorescence in the visible light wave length range of 400–800 m$\mu$ can be measured, not only instrumentally but also with the naked eye.

The fluorescence emitted by the isoprene polymer film bears a close relation to the degree of vulcanization of the vulcanized products. As the degree of vulcanization increases the brightness of the fluorescence becomes more intensified. Therefore, by ascertaining in advance the relation between the degree of vulcanization and the brightness of the fluorescence for a given vulcanized product the degree of vulcanization of other products made in the same way from the same vulcanizable composition can be easily determined by monitoring the brightness of the fluorescence emitted by such other products. The brightness of the fluorescence increases as the degree of vulcanization increases, so that the optimal vulcanization point of the product can usually be observed, depending on the types of the vulcanizable composition being used. Accordingly, by ascertaining in advance the relationship between the optimal vulcanization point for a specific vulcanizable composition and the brightness of the fluorescence of such composition at such point, then the optimal vulcanization point can be easily ascertained by monitoring the brightness of the fluorescence.

The examples of the invention will be given hereinafter.

EXAMPLE 1

(1) Preparation of rubber sheets

Rubber sheets were prepared from compositions Nos. 1–6 which are listed below in Table 1, wherein the proportion of the components of such compositions are given in parts by weight.

Each of the rubbers listed in Table 1 was first masticated on an 8" diameter mill roll, and the other additives of the Table 1 compositions were further mixed homogeneously with the rubber and shaped on the rolls into large sheets, which were 2 mm. thick, and after being cooled, the large sheets were cut into 30 cm. x 12 cm. test sheets.

(2) Preparation of thin isoprene polymer film and vulcanization

"Natsyn 2200," synthetic homopolymeric isoprene rubber having a cis-1,4 content of 96.9 weight percent (a product of Goodyear Tire and Rubber Co., U.S.A.), was dissolved in toluene to make a 15 weight percent solution and the solution was poured evenly over polyester film 0.14 mm. thick, and then the solvent was vaporized to dryness. The total thickness of the dried and coated film was 0.5 mm., and the coated film was cut into 4 cm. x 4 cm. squares.

In separate molds, each measuring 30 cm. x 12 cm. x 0.2 cm., and maintained at 50° C., there was placed one of the sheets obtained under (1) above and each sheet was pressed to flatten it out. At the center of each sheet a square of the film prepared under (2) was placed with its isoprene rubber side down. Then the sheets were vulcanized by heating under the conditions prescribed in Table 3 below.

The vulcanizations were carried out on each of the respective sheets for 7.5, 10, 20, 30, 40, and 60 minutes to prepare the vulcanized samples.

(3) Evaluation of the degree of vulcanization (a) Brightness of fluorescence. — A mercury-vapor lamp, 200 v., 75 w. was used as a source of light, and ultraviolet light rays emitted therefrom were passed through a filter to provide ultraviolet light rays in the vicinity of a dominant wave length, 365 m$\mu$. The selected ultraviolet light rays were irradiated to the Natsyn rubber coated films on the vulcanized sample sheets after removing the polyester film, and the resulting fluorescence emitted from such coated films was passed through an ultraviolet light ray cut filter, and the brightness of the fluorescence was measured by a photoelectric cell. The degree of brightness of the fluorescence emitted from the samples was compared with the degree of brightness of the fluorescence, set at a value of 100, which was obtained by applying ultraviolet light to a vulcanized article obtained from the following composition, using the above described source of ultraviolet light.

TABLE 1

|  | No. 1 | No. 2 | No. 3 | No. 4 | No. 5 | No. 6 |
|---|---|---|---|---|---|---|
| "SBR 1502"[1] | 100.00 |  |  |  |  |  |
| "Royalene 301"[2] |  | 100.00 |  |  |  |  |
| "Polysar Butyl 301"[3] |  |  | 100.00 |  |  |  |
| "BR 01"[4] |  |  |  | 100.00 |  |  |
| "Diene NF 35"[5] |  |  |  |  | 100.00 |  |
| "Hycar 1042"[6] |  |  |  |  |  | 100.00 |
| Sulphur | 1.75 | 1.50 | 1.50 | 1.75 | 1.75 | 1.75 |
| Mercapto benzo thiazol | 1.50 | 0.40 |  | 1.50 | 1.50 | 1.50 |
| Tetramethyl thiuram monosulfide | 0.50 | 1.20 |  | 0.30 | 0.30 | 0.30 |
| Tetramethyl thiuram disulfide |  |  | 0.50 |  |  |  |
| Tellurium diethyl dithiocarbamate |  |  | 1.50 |  |  |  |
| "Acting SL"[7] |  |  |  | 0.80 | 0.80 |  |
| Zinc oxide | 2.50 | 2.50 | 2.50 | 2.50 | 2.50 | 2.50 |
| Stearic acid | 1.00 | 1.00 |  | 1.00 | 1.00 | 1.00 |
| Diethylene glycol |  |  | 2.00 |  |  |  |
| Process oil | 5.00 | 5.00 | 15.00 | 5.00 | 5.00 | 5.00 |
| Magnesium carbonate | 40.00 | 50.00 | 50.00 | 40.00 | 40.00 | 40.00 |

[1] "SBR 1502"—Trademark, styrene butadiene rubber of Nihon Gosei Gum Co., Ltd., Japan, having a styrene content of 23.5 weight percent.
[2] "Royalene 301"—Trademark, ethylene-propylene-diene terpolymer of U.S. Rubber Corp., U.S.A., having an iodine value of 12.
[3] "Polysar Butyl 301"—Trademark, isobutylene-isoprene rubber of Polymer Corp., Canada, having an unsaturation of 1.6 weight percent.
[4] "BR 01"—Trademark, homopolymeric butadiene rubber of Nihon Gosei Gum Co., Ltd., Japan, having a cis-1,4 content of 97.5 weight percent, trans content of 1.2 weight percent and vinyl content of 1.3 weight percent.
[5] "Diene NF 35"—Trademark, homopolymeric butadiene rubber of Asahi Kasei Co., Ltd., Japan, having a cis-1,4 content of 35 weight percent and trans content of 55 weight percent.
[6] "Hycar 1042"—Trademark, nitrile-butadiene rubber of Goodrich Chemical Corp., U.S.A., having a nitrile content of 33 weight percent.
[7] "Acting SL"—Trademark, activator of Yoshitomi Pharmaceutical Co., Ltd., Japan

TABLE 2

(Preparation of standard substance)

| | Parts by weight |
|---|---|
| "Natsyn 2200" (polyisoprene rubber) | 100 |
| Sulfur | 2.5 |
| Zinc oxide | 2.5 |
| Mercapto benzothiazole | 1.2 |
| Tetramethyl thiuram monosulfide | 0.3 |
| Stearic acid | 1.0 |
| Magnesium carbonate | 40.0 |

The above components were mixed as in Example 1(1) and molded into a sheet, 25 cm. x 25 cm. x 0.2 cm. and press-cured at 130° C. for 60 minutes.

(b) Tensile strength.—The tensile strength of vulcanized sheets of each sample were measured according to Japanese Industrial Standard K 6301.

The brightness of fluorescence found in (a) above is compared below with the results obtained by the application of ultraviolet light as described in paragraph (3)-(a) above to vulcanized sheets directly without using an isoprene rubber film on such sheets, in the following Table 3.

TABLE 3

| Sample | Vulcanizing conditions Temp., °C. | Time, min. | Brightness of fluorescence Rubber film not used | Rubber film used | Tensile strength, kg./cm. |
|---|---|---|---|---|---|
| No. 1 | 140 | 7.5 | 4 | 4 | |
| | 140 | 10 | 4 | 4 | 3 |
| | 140 | 20 | 6 | 30 | 20 |
| | 140 | 30 | 7 | 80 | 34 |
| | 140 | 40 | 9 | 100 | 26 |
| | 140 | 60 | 10 | 100 | |
| No. 2 | 150 | 7.5 | 4 | 37 | 70 |
| | 150 | 10 | 5 | 55 | 95 |
| | 150 | 20 | 5 | 78 | 119 |
| | 150 | 30 | 5 | 85 | 130 |
| | 150 | 40 | 5 | 97 | 138 |
| | 150 | 60 | 5 | 100 | 130 |
| No. 3 | 150 | 7.5 | 4 | 6 | 45 |
| | 150 | 10 | 4 | 47 | 87 |
| | 150 | 20 | 5 | 75 | 104 |
| | 150 | 30 | 5 | 82 | 88 |
| | 150 | 40 | 5 | 90 | 63 |
| | 150 | 60 | 5 | 95 | |
| No. 4 | 130 | 7.5 | 4 | 4 | |
| | 130 | 10 | 4 | 8 | |
| | 130 | 20 | 5 | 17 | |
| | 130 | 30 | 5 | 28 | |
| | 130 | 40 | 5 | 37 | |
| | 130 | 60 | 5 | 40 | |
| No. 5 | 130 | 7.5 | 4 | 5 | |
| | 130 | 10 | 4 | 10 | |
| | 130 | 20 | 5 | 29 | |
| | 130 | 30 | 5 | 35 | |
| | 130 | 40 | 5 | 40 | |
| | 130 | 60 | 5 | 40 | |
| No. 6 | 130 | 7.5 | 4 | 4 | |
| | 130 | 10 | 4 | 8 | |
| | 130 | 20 | 5 | 30 | |
| | 130 | 30 | 5 | 31 | |
| | 130 | 40 | 5 | 32 | |
| | 130 | 60 | 5 | 32 | |

From the above results it is obvious that, when the polymer film is used according to the invention, as the vulcanization reaction proceeds due to the extension of the vulcanization time the progress of the vulcanization can be followed by the increasing strength of the fluorescence being emitted. Therefore, by predetermining the brightness of fluorescence for the desired degree of vulcanization for a particular vulcanizable composition, the degree of vulcanization of such composition can be easily evaluated by simply observing the brightness of fluorescence of the vulcanized article, and since the fluorescence is within the visible range the evaluation can be done with the naked eye, so that the evaluation process is markedly simplified.

EXAMPLE 2

Three kinds of sample sheets were prepared from composition Nos. 7-9 of the Table 4 as in Example 1(1):

TABLE 4

| | Composition No. 7 | No. 8 | No. 9 |
|---|---|---|---|
| SBR 1502 | 100.00 | | |
| Royalene 301 | | 100.00 | |
| Polysar Butyl 301 | | | 100.00 |
| Sulfur | 1.75 | 1.50 | 1.50 |
| Mercapto benzothiazol | 2.10 | 0.50 | |
| Tetramethyl thiuram monosulfide | 0.70 | 1.50 | |
| Tetramethyl thiuram disulfide | | | 1.00 |
| Tellurium dimethyl-dithiocarbamate | | | 3.00 |
| Zinc oxide | 2.50 | 2.50 | 2.50 |
| Stearic acid | 1.00 | 1.00 | |
| Diethylene glycol | | | 2.00 |
| Process oil | 5.00 | 5.00 | 15.00 |
| Magnesium carbonate | 40.00 | 50.00 | 50.00 |

Each of the sheets prepared from the above compositions were placed in a separate mold, measuring 30 cm. x 12 cm. x 0.2 cm., and maintained at 50° C., and the surface of each of the sheets were flattened out, and the center of each sheet was coated with a 15 weight percent toluene solution of natural pale crape rubber and dried to form a rubber film, 4 cm. x 4 cm. square, and that film then was covered with a polyester film 0.14 mm. thick. Then the sheet was vulcanized under the conditions indicated in Table 5 below.

The brightness of fluorescence and tensile strength were measured in the manner disclosed in Example 1(3)(a) and (3)(b). The results are shown in Table 5.

TABLE 5

| Sample | Vulcanizing conditions Temp., °C. | Time, min. | Brightness of fluorescence Rubber film not used | Rubber film used | Tensile strength, kg./cm.² |
|---|---|---|---|---|---|
| No. 7 | 140 | 7.5 | 4 | 4 | |
| | 140 | 10 | 4 | 5 | 12 |
| | 140 | 20 | 6 | 80 | 43 |
| | 140 | 30 | 7 | 96 | 26 |
| | 140 | 40 | 9 | 100 | 23 |
| | 140 | 60 | 10 | 100 | 18 |
| No. 8 | 150 | 7.5 | 4 | 35 | |
| | 150 | 10 | 5 | 48 | 85 |
| | 150 | 20 | 5 | 72 | 109 |
| | 150 | 30 | 5 | 82 | 122 |
| | 150 | 40 | 5 | 88 | 97 |
| | 150 | 60 | 5 | 92 | |
| No. 9 | 150 | 7.5 | 4 | 8 | 95 |
| | 150 | 10 | 4 | 20 | 105 |
| | 150 | 20 | 5 | 82 | 41 |
| | 150 | 30 | 5 | 97 | 31 |
| | 150 | 40 | 5 | 99 | 29 |
| | 150 | 60 | 5 | 100 | |

EXAMPLE 3

Three kinds of sample sheets were prepared from compositions Nos. 10-12 of Table 6 as in Example 1(1):

TABLE 6

| | Composition No. 10 | No. 11 | No. 12 |
|---|---|---|---|
| "SBR 1502" | 100.00 | 100.00 | 100.00 |
| Sulfur | 1.75 | 1.75 | 1.75 |
| Mercapto benzothiazole | 2.70 | | |
| Tetramethyl thiuram monosulfide | 0.90 | | |
| Diphenyl guanidine | | 1.00 | |
| Dibenzo thiazyl disulfide | | 1.80 | |
| N-cyclohexyl-2-benzo thiazole | | | 2.00 |
| Zinc oxide | 2.50 | 2.50 | 2.50 |
| Stearic acid | 1.00 | 1.00 | 1.00 |
| Process oil | 5.00 | 5.00 | 5.00 |
| Magnesium carbonate | 40.00 | 40.00 | 40.00 |

Each of the sheets obtained was placed in a separate mold, measuring 30 cm. x 12 cm. x 0.2 cm., and maintained at 50° C. Each sheet was flattened out, and on each sheet, at the center thereof, there was placed NIR film prepared by the following method, and the sheets were then heated under the conditions indicated in Table 7 to vulcanize the sheets.

"Krynac 833X1" (trademark for a nitrile-isoprene rubber of Polymer Corp., Canada) was masticated on 8″ diameter mill roll to form films, 1.0 mm., 1.5 mm. and 2.0 mm. thick, and the films were then cooled to room temperature. Then such films were placed on polyester film and cut into 4 cm. x 4 cm. squares. The 1.0 mm., 1.5 mm. and 2.0 mm. thick squares were placed on the sheets made from compositions No. 10, No. 11 and No. 12 respectively before the sheets were vulcanized.

The brightness of the fluorescence and the tensile strength of the vulcanized samples were measured in the manner disclosed in Examples 1(3)(a) and (3)(b), with the following results:

TABLE 7

| Sample | Vulcanizing conditions | | Brightness of fluorescence | | Tensile strength, kg./cm.² |
| --- | --- | --- | --- | --- | --- |
| | Temp., °C. | Time, min. | Rubber film not used | Rubber film used | |
| No. 10 | 140 | 7.5 | 6 | 31 | 31 |
| | 140 | 10 | 7 | 61 | 35 |
| | 140 | 20 | 9 | 90 | 26 |
| | 140 | 30 | 10 | 100 | 25 |
| | 140 | 40 | 12 | 100 | 23 |
| | 140 | 60 | 13 | 100 | 21 |
| No. 11 | 140 | 7.5 | 4 | 4 | |
| | 140 | 10 | 4 | 5 | 14 |
| | 140 | 20 | 6 | 30 | 33 |
| | 140 | 30 | 7 | 50 | 28 |
| | 140 | 40 | 9 | 70 | 30 |
| | 140 | 60 | 10 | 90 | 23 |
| No. 12 | 140 | 7.5 | 4 | 4 | |
| | 140 | 10 | 4 | 4 | |
| | 140 | 20 | 5 | 10 | 7 |
| | 140 | 30 | 5 | 80 | 19 |
| | 140 | 40 | 5 | 90 | 19 |
| | 140 | 60 | 5 | 95 | 17 |

EXAMPLE 4

Sample sheet was prepared from composition No. 13 of Table 8 as in Example 1(1).

TABLE 8

Composition No. 13

| | |
| --- | --- |
| "Elastothan 455 Rubber" | 100 |
| Sulphur | 2.00 |
| Dibenzo thiazol disulfide | 4.00 |
| Mercapto benzo thiazole | 2.00 |
| "ZC*456 Activator" | 2.00 |
| Cadmium stearate | 0.50 |

NOTE: "Elastothan 455 Rubber": Polyurethane rubber of Thiokol Chemical Corporation, U.S.A.
"ZC-456 Activator": Activator of Thiokol Chemical Corporation, U.S.A.

Then polyisoprene rubber film, the same as that employed in Example 1 was placed on the sheet and the sheet was vulcanized as in Example 1, and the brightness of the fluorescence and the tensile strength of the vulcanized sheets were shown in Table 9.

TABLE 9

| Sample | Vulcanizing conditions | | Brightness of fluorescence | | Tensile strength, kg./cm.² |
| --- | --- | --- | --- | --- | --- |
| | Temp., °C. | Time, min. | Rubber film not used | Rubber film used | |
| No. 13 | 150 | 7.5 | 4 | 4 | 240 |
| | 150 | 10 | 4 | 9 | 330 |
| | 150 | 20 | 5 | 17 | 360 |
| | 150 | 30 | 5 | 19 | 340 |
| | 150 | 40 | 6 | 25 | 300 |
| | 150 | 60 | 6 | 35 | 210 |

EXAMPLE 5

From composition No. 2 shown in Table I sheets were prepared in the same manner as in Example 1. While three kinds of isoprene polymer film were prepared in the same manner as in Example 1 by using "Natsyn 400" (a polyisoprene rubber of Goodyear Tire and Rubber Co., U.S.A.), "Shell Isoprene Rubber 309" (A polyisoprene rubber of Shell Chemical Corporation, U.S.A.).

The film was placed on the respective sheets and the sheets were vulcanized as in Example 1. The brightness of the fluorescence and the tensile strength of the vulcanized sheets were shown in Table 10.

TABLE 10

| Sample | Isoprene rubber film | Vulcanization conditions | | Brightness of fluorescence | Tensile strength, kg./cm.² |
| --- | --- | --- | --- | --- | --- |
| | | Temp., °C. | Time, min. | | |
| No. 14 | None | 150 | 7.5 | 4 | 75 |
| | do | 150 | 10.0 | 5 | 95 |
| | do | 150 | 20 | 5 | 120 |
| | do | 150 | 30 | 5 | 130 |
| | do | 150 | 40 | 5 | 135 |
| | do | 150 | 60 | 5 | 130 |
| No. 15 | "Natsyn 400" | 150 | 7.5 | 37 | 75 |
| | do | 150 | 10 | 54 | 95 |
| | do | 150 | 20 | 77 | 120 |
| | do | 150 | 30 | 84 | 130 |
| | do | 150 | 40 | 94 | 135 |
| | do | 150 | 60 | 95 | 130 |
| No. 16 | "Shell Isoprene Rubber 309" | 150 | 7.5 | 30 | 75 |
| | do | 150 | 10 | 48 | 95 |
| | do | 150 | 20 | 68 | 120 |
| | do | 150 | 30 | 77 | 130 |
| | do | 150 | 40 | 84 | 135 |
| | do | 150 | 60 | 86 | 130 |
| No. 17 | "Gutta-Percha" | 150 | 7.5 | 30 | 75 |
| | do | 150 | 10 | 42 | 95 |
| | do | 150 | 20 | 51 | 120 |
| | do | 150 | 30 | 52 | 130 |
| | do | 150 | 40 | 54 | 135 |
| | do | 150 | 60 | 57 | 130 |

EXAMPLE 6

Three kinds of sample sheets were prepared from compositions Nos. 18–20 of Table 11 as in Example 1(1):

TABLE 11

| | Composition | | |
|---|---|---|---|
| | No. 18 | No. 19 | No. 2 |
| Natural rubber (No. 3 RSS) | 100.00 | 100.00 | 100.00 |
| Sulfur | 3.00 | 3.00 | 3.00 |
| Mercapto benzothiazole | 1.00 | 1.00 | 1.00 |
| Zinc oxide | 5.00 | 5.00 | 5.00 |
| Stearic acid | 3.00 | 3.00 | 3.00 |
| Process oil | 3.00 | 3.00 | 3.00 |
| Carbon black (HAF) | 5.00 | 50.00 | 75.00 |

Then, polyisoprene rubber film, same as that employed in Example 1 was placed on the sheets and the sheets were vulcanized as in Example 1, and the brightness of the fluorescence and the tensile strength of the vulcanized sheets were as shown in Table 12.

TABLE 12

| | Vulcanizing conditions | | Brightness of fluorescence | | |
|---|---|---|---|---|---|
| Sample | Temp., °C. | Time, min. | Rubber film not used | Rubber film used | Tensile strength, kg./cm.² |
| No. 18 | 130 | 7.5 | 4 | 12 | 94 |
| | 130 | 10 | 4 | 12 | 94 |
| | 130 | 20 | 4 | 14 | 135 |
| | 130 | 30 | 4 | 20 | 184 |
| | 130 | 40 | 4 | 23 | 190 |
| | 130 | 60 | 4 | 29 | 210 |
| No. 19 | 130 | 7.5 | 4 | 11 | 148 |
| | 130 | 10 | 4 | 11 | 194 |
| | 130 | 20 | 4 | 13 | 232 |
| | 130 | 30 | 4 | 22 | 241 |
| | 130 | 40 | 4 | 29 | 246 |
| | 130 | 60 | 4 | 35 | 227 |
| No. 20 | 130 | 7.5 | 4 | 13 | 195 |
| | 130 | 10 | 4 | 14 | 202 |
| | 130 | 20 | 4 | 15 | 219 |
| | 130 | 30 | 4 | 21 | 220 |
| | 130 | 40 | 4 | 25 | 216 |
| | 130 | 60 | 4 | 34 | 200 |

EXAMPLE 7

Three kinds of sheets were prepared from compositions Nos. 21–23 as in Example 3(1).

TABLE 13

| | Composition | | |
|---|---|---|---|
| | No. 21 | No. 22 | No. 23 |
| Natural rubber (No. 5 RSS) | 52.00 | | |
| SBR 1502 | 48.00 | 100.00 | |
| Polysar Butyl 301 | | | 70.00 |
| Royalen 301 | | | 30.00 |
| Sulfur | 2.00 | 2.00 | 1.00 |
| Mercapto benzothiazole | 1.80 | 2.00 | |
| Tetramethyl thiuram monosulfide | 0.20 | | |
| Dibenzo thiazol disulfide | | 0.50 | |
| "Accelerator RL–14" | | | 1.50 |
| Acting SL | 1.00 | 2.50 | |
| Zinc oxide | 2.50 | 2.50 | 5.00 |
| Stearic acid | 1.00 | 2.00 | 1.00 |
| Process oil | | 22.50 | |
| Silicon dioxide (hydrated) | 30.00 | 90.00 | |
| Precipitated calcium carbonate | 30.00 | | |
| Calcium carbonate | | 15.00 | 12.00 |
| Carbon black (MT) | 35.00 | | 70.00 |
| Ultramarine | | 4.00 | |

NOTE.—Accelerator "RL–14": Trademark, vulcanizing accelerator of Sumitomo Chemical Co. Ltd., Japan.

Then polyisoprene rubber film made as in Example 1 was placed on the sheets and the sheets were vulcanized as in Example 1, and the brightness of the fluorescence and the tensile strength of the vulcanized products were measured with the following results:

TABLE 14

| | Vulcanizing conditions | | Brightness of fluorescence | | |
|---|---|---|---|---|---|
| Sample | Temp., °C. | Time, min. | Rubber film not used | Rubber film used | Tensile strength, kg./cm.² |
| No. 21 | 130 | 5 | 4 | 6 | 115 |
| | 130 | 7.5 | 4 | 11 | 160 |
| | 130 | 10 | 4 | 13 | 168 |
| | 130 | 20 | 4 | 21 | 170 |
| | 130 | 40 | 4 | 34 | 166 |
| | 130 | 60 | 4 | 41 | 153 |
| No. 22 | 130 | 7.5 | 4 | 16 | 78 |
| | 130 | 10 | 5 | 18 | 84 |
| | 130 | 20 | 5 | 25 | 96 |
| | 130 | 30 | 5 | 33 | 100 |
| | 130 | 40 | 5 | 40 | 90 |
| | 130 | 60 | 5 | 49 | 77 |
| | 130 | 80 | 5 | 52 | 60 |
| No. 23 | 150 | 7.5 | 4 | 10 | 90 |
| | 150 | 10 | 4 | 12 | 100 |
| | 150 | 20 | 4 | 16 | 119 |
| | 150 | 30 | 4 | 19 | 125 |
| | 150 | 40 | 4 | 26 | 130 |
| | 150 | 60 | 4 | 38 | 122 |
| | 150 | 80 | 4 | 50 | 120 |

EXAMPLE 8

Unvulcanized canvas shoes were prepared by using composition No. 21 of Example 7 for the outer sole, and on the shank of each of the outer soles of the thus shaped unvulcanized shoes a polyisoprene rubber film, 1 cm. x 1 cm. square, covered with polyester film and prepared as in Example 1 was placed with its "Natsyn" rubber side facing the unvulcanized rubber of the shoes.

Canvas shoes thus prepared, 330 pairs (660 shoes) per lot, were placed on the racks of a vulcanizing cart and the cart was placed in a cylindrical autoclave, 160 cm. in diameter and 400 cm. long, and equipped with steam heating coils.

The autoclave was closed airtight and heated to about 135° C. within 20 minutes by passing hot steam through the heating coils. The inner pressure of the autoclave was 3.5 kg./cm.². Thereafter, the vulcanization was continued for another 40 minutes under such conditions. Then the heating was stopped and the pressure was returned to normal and the finished products on the cart were taken out and cooled at room temperature for 15 min.

Then the vulcanized products were removed from the racks, the lasts were removed, the polyester films were stripped off, and the shoes were then delivered to an inspection room by a belt conveyor. The removal of the polyester film did not effect a removal of the unvulcanized polyisoprene rubber film.

The shoes on the belt were each inspected in about 10 seconds for the degree of vulcanization thereof without damaging the products by passing the shoes past a testing box.

The testing box was 50 cm. long and 40 cm. high with an observation hole on the top, and it bridged the belt passing beneath it and exterior light was completely shut out from the interior of the box. In the inside of the box an ultraviolet light source similar to that employed in Example 1 was provided and a comparative evaluation of the fluorescence of the products on the belt was made with a standard sample for measuring the degree of vulcanization.

Thus, when the products passed through the testing box the brightness of the fluorescence of the polyisoprene film patch on the product and that of the standard sample were compared and the brightness of the fluorescence of the 660 shoes was as follows:

| Product group | Degree of brightness of products in the group | Number of shoes in group |
|---|---|---|
| A | Brightness of fluorescence was the same as that of the vulcanized product of Table 14, Composition No. 21, vulcanized for 5 minutes | 7 |
| B | Brightness of fluorescence was the same as that of the vulcanized product of Table 14, Composition No. 21, vulcanized for 7.5 minutes | 120 |
| C | Brightness of fluorescence was the same as that of the vulcanized product of Table 14, Composition No. 21, vulcanized for 10 minutes | 160 |
| D | Brightness of fluorescence was the same as that of the vulcanized product of Table 14, Composition No. 21, vulcanized for 20 minutes | 210 |
| E | Brightness of fluorescence was the same as that of the vulcanized product of Table 14, Composition No. 21, vulcanized for 40 minutes | 150 |
| F | Brightness of fluorescence was the same as that of the vulcanized product of Table 14, Composition No. 21, vulcanized for 60 minutes | 13 |

Thus, the products of groups B, C, D and E were passed for final finish as being satisfactory in physical properties, and after an inspection for appearance they were packed and stored as first quality.

The products of groups A and F showed no defects outwardly and in the usual lot inspection procedure they would have been passed as first quality but on the basis of the evaluation thereof in accordance with the present invention they were classified as 2nd quality because of unsatisfactory vulcanization (A: insufficient and F: excessive vulcanization). Thus the inspection of entire lot for physical properties could be carried out efficiently and accurately.

EXAMPLE 9

In the vulcanization of rubber boot soles prepared from composition No. 22 of Example 7, a polyisoprene rubber film 1 cm. x 1 cm. prepared as in Example 1 was placed on the bottom portion of the mold with the isoprene rubber facing up, and the mold was then charged with vulcanizable rubber composition No. 22 and the system was then vulcanized at 160° C. for 4 minutes in multiple platen press.

The vulcanized products were then taken out of the molds and cooled at room temperature for 30 minutes, and inspected by exposing the polyisoprene rubber film on the products to ultraviolet rays in a dark room. The brightness of the fluorescence of the film was compared, with the naked eye, with the fluorescence of vulcanized sample No. 22 in Table 14, and it was found that the products vulcanized for four minutes had properties which corresponded to the sample No. 22 products vulcanized for 30 and 40 minutes, so that desirable products were obtained.

EXAMPLE 10

In preparing roofing sheet 2 mm. thick from composition No. 23 of Example 7, a polyisoprene rubber film 1 cm. x 1 cm. prepared as in Example 1 was placed on the surface of the rubber sheet and the rubber sheet, which was 1.5 m. wide and 25 m. long, was wound on an iron drum together with a linear cloth and vulcanized in an autoclave under a pressure of 2 kg./cm.$^2$, at 130° C. for 60 minutes by introducing steam into the autoclave.

Then, in a dark room, the polyisoprene rubber film coated side of the resultant roofing sheet was exposed to ultraviolet rays as in Example 1, and the brightness of the fluorescence of the film was observed with the naked eye and compared with the fluorescence of the No. 23 composition samples of Table 14, and the brightness of the fluorescence of the roofing sheet product was found to correspond to the brightness of the No. 23 composition products vulcanized for 10–20 minutes at 150° C. Thus, this roofing rubber sheet was considered not to have attained a proper degree of vulcanization.

When the vulcanization of the sheet at 130° C. was extended to 90 minutes, however, the sheet showed a brightness of fluorescence comparable to that of the products vulcanized for 30 and 40 minutes at 150° C. and was considered as being properly vulcanized.

What we claim is:

1. A process for evaluating the degree of vulcanization of a vulcanized article made from a vulcanizable rubber based composition, said sulfur vulcanizable composition being one which in its vulcanized state only emits fluorescence under exposure to ultraviolet light which is weak, which comprises molding said vulcanizable composition into a desired shape, providing a film of an isoprene polymer having an isoprene content of $\geq 50$ weight percent on the surface of the shaped vulcanizable article, vulcanizing the thus shaped composition, exposing said film to ultraviolet light, and evaluating the brightness of the fluorescence of said film under such exposure as a measure of the degree of vulcanization of said article.

2. A process as in claim 1 in which said vulcanizable composition is sulfur-curable and contains synthetic rubber having isoprene content of less than 30 weight percent and sulfur.

3. A process as in claim 1 in which said vulcanizable composition contains at least one of natural and synthetic rubbers, sulfur and carbon black.

4. A process as in claim 1 in which said film comprises a homopolymer of isoprene.

5. A process as in claim 4 in which said film comprises natural rubber.

6. A process as in claim 5 in which said film comprises a synthetic homopolymer of isoprene.

7. A process as in claim 1 in which said film is exposed to ultraviolet light with a wave length of 250 to 400 m$\mu$.

8. A process as in claim 1 in which said vulcanizable composition contains at least one rubber selected from the group consisting of natural rubber, synthetic homopolymeric isoprene rubber, nitrile-isoprene rubber, styrene-butadiene rubber, nitrile-butadiene rubber, chloroprene rubber, isobutylene-isoprene rubber.

9. A process as in claim 8 in which said rubber comprises at least one rubber selected from the group consisting of natural rubber, styrene-butadiene rubber, ethylene-propylene-diene rubber, isobutylene-isoprene rubber, homopolymeric butadiene rubber and nitrile-butadiene rubber.

References Cited

UNITED STATES PATENTS

| 3,268,495 | 8/1966 | Convert | 260—85.3 |
| 3,445,656 | 5/1969 | Hull | 250—71 |

JOSEPH L. SCHOFER, Primary Examiner

C. A. HENDERSON, Jr., Assistant Examiner

U.S. Cl. X.R.

117—139; 250—71; 260—5, 23.7, 37, 41.5, 77.5, 785, 793; 264—40, 236, 347